Oct. 2, 1928.

W. J. ANDRES 1,686,360

OPERATING CONNECTION

Filed Dec. 17, 1925

INVENTOR
WILLIAM J. ANDRES
BY
M. W. McConkey
ATTORNEY

Patented Oct. 2, 1928.

1,686,360

UNITED STATES PATENT OFFICE.

WILLIAM JOSEPH ANDRES, OF SOUTH BEND, INDIANA, ASSIGNOR TO BENDIX BRAKE COMPANY, OF CHICAGO, ILLINOIS, A CORPORATION OF ILLINOIS.

OPERATING CONNECTION.

Application filed December 17, 1925. Serial No. 75,924.

This invention relates to operating connections of the type used in applying automobile brakes, and is illustrated as embodied in an automobile chassis having brakes on all four wheels.

It is desirable to have the brake-applying connections, so far as possible, outside the chassis frame, to avoid interference with the engine, clutch, and other parts supported by the frame. It is necessary that these connections permit the wheels to be swivelled nearly against the frame, to give a maximum displacement of the wheels of something like 38° thus making it desirable that the brake-applying connections be within the limits defined by the frame, or substantially so, opposite the rear edges of the wheels.

An object of the invention is to provide novel lever mechanism, or other means, preferably supported by the frame, for affording the desired clearance for the wheel without necessitating arranging the connections inside the frame. I prefer a novel horizontal lever fulcrumed on the frame, and serving additionally as a power-multiplying lever, and joining the two parts of the connections in a manner giving the desired clearance.

The above and other objects and features of the invention, including various novel combinations of parts and desirable particular constructions, will be apparent from the following description of the illustrative embodiments shown in the accompanying drawing, in which:

Fig. 1 is a top plan view of the chassis, showing the connections embodying one modification of the invention;

Figure 1:
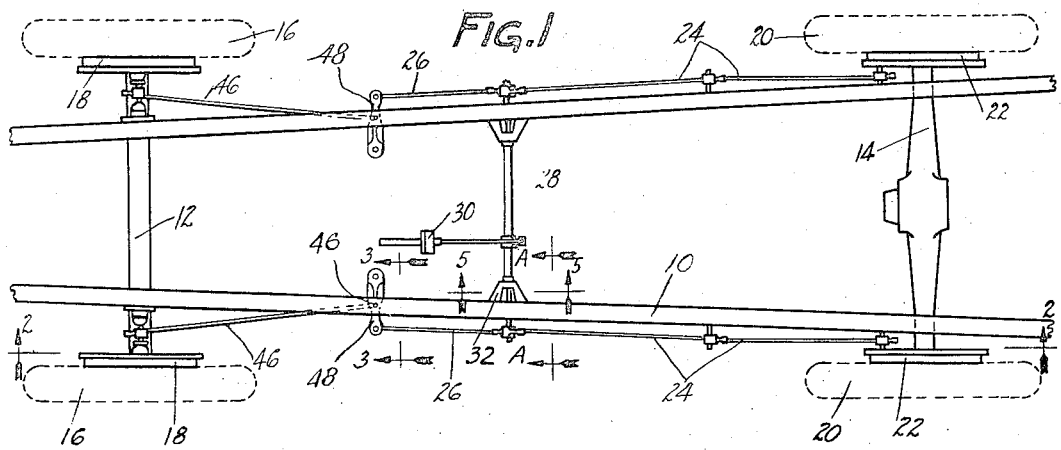
Figure 2:
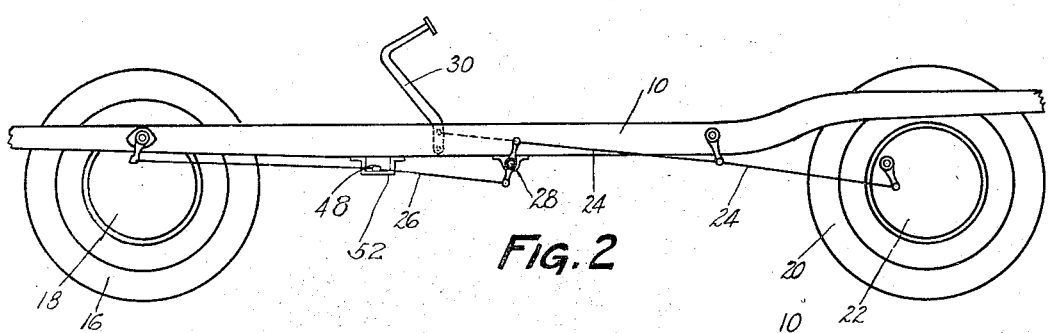
Fig. 2 is a diagrammatic longitudinal section on the line 2—2 of Fig. 1, showing the connections in side elevation.

The chassis of Figs. 1 and 2 includes a frame 10 supported by the usual springs (not shown) on a front axle 12 and a rear axle 14. Front axle 12 is carried by swivelled front wheels 16 having brakes 18, and rear axle 14 is carried by drive wheels 20 having brakes 22 operated by rods or other connections 24 arranged outside frame 10. Front brakes 18 also have rods or other operating connections 26 arranged outside the frame.

Figure 6:
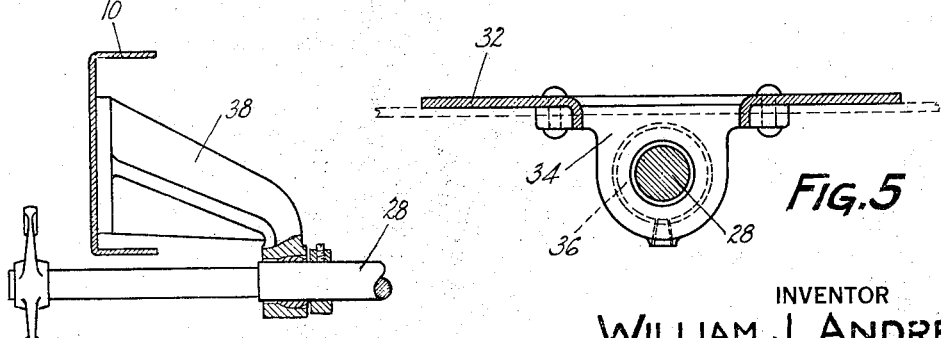
Fig. 6 is a view corresponding to a section on the line A—A of Fig. 1, but showing a different bracket.

Connections 24 and 26 are operated, to apply all the brakes, by a single shaft 28 rocked by a pedal 30. Shaft 28 is of reduced diameter at its ends, so that the ends may flex slightly to give approximate equalization between front and rear brakes. At its ends, where the reduction in diameter begins, the shaft 28 is supported by sheet metal brackets 32, to which are riveted or otherwise secured journals 34 forming sockets universally receiving balls 36 on the shaft, thus providing self-alining joints. If preferred, forged brackets 38 may be used (Fig. 6). In either case the brackets are secured to the side members of frame 10.

Figures 3, 4, 5:
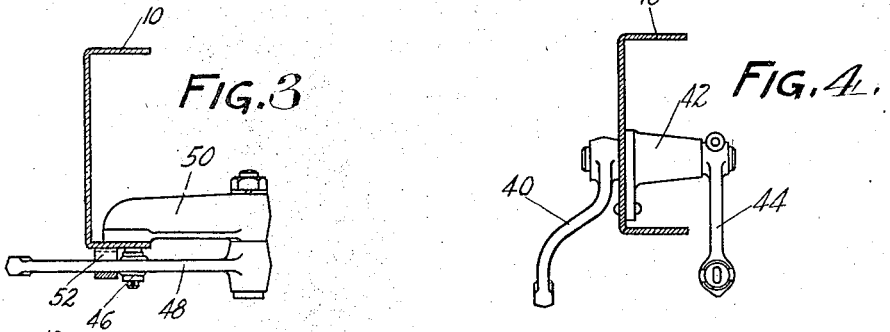
Fig. 3 is a transverse vertical section on the line 3—3 of Fig. 1, showing the first form of novel lever mechanism in rear elevation.
Fig. 4 is a transverse vertical section corresponding to Fig. 3, but showing a different form of lever mechanism.
Fig. 5 is a section on the line 5—5 of Fig. 1, showing part of the bracket supporting one end of the central cross-shaft; and

In the arrangement of Fig. 4, the front ends of operating connections 26 are pivoted to levers 40 secured to shafts projecting through the frame 10 and through supports 42 secured to the frame, and rocking levers 44 inside the frame. Levers 44 are pivoted directly to the rear ends of brake-applying rods or other connections 46 (Fig. 1) inclined rearwardly in a horizontal plane from the brakes. The inclination of connections 46 gives ample clearance for the wheels.

If it is desired to utilize the lever mechanism to increase the leverage of the brake system, I prefer a horizontal lever 48 (Figs. 1–3) for each brake. Each lever 48 extends under its side frame member, being fulcrumed at its inner end on a bracket 50 secured to the side frame member, and pivotally connected at its outer end to the front end of its connection 26. Between its ends, and just below the side member of frame 10, lever 48 is pivoted to the rear end of brake-applying connection 46. This gives approximately 2 to 1 leverage. Lever 48 may, if desired, be supported by a yoke 52 secured to the bottom of the side frame members.

While two illustrative embodiments have been described in detail, it is not my intention to limit the scope of the invention to those particular embodiments, or otherwise than by the terms of the appended claims.

I claim:

1. A vehicle having a chassis frame and swivelled wheels on opposite sides of the frame having brakes, and comprising, in combination therewith, a brake-applying connection for each brake inclined rearwardly in a horizontal plane and terminating inside the outer edge of the frame to clear the wheel in its extreme position, an operating connection for each brake-applying connection outside the frame terminating opposite the rear end of the corresponding brake-applying connection, and a motion-transmitting means supported by each side of the frame the two means connecting each of the operating connections outside the frame to the corresponding brake-applying connection inside the outer edge of the frame.

2. A vehicle having a chassis frame and swivelled wheels on opposite sides of the frame having brakes, and comprising, in combination therewith, a brake-applying connection for each brake inclined rearwardly in a horizontal plane and terminating inside the outer edge of the frame to clear the wheel in its extreme position, an operating connection for each brake-applying connection outside the frame terminating opposite the rear end of the corresponding brake-applying connection, and a lever mechanism supported by each side of the frame the two mechanisms connecting each of the operating connections outside the frame to the corresponding brake-applying connection inside the outer edge of the frame.

3. A vehicle having a chassis frame and swivelled wheels on opposite sides of the frame having brakes, and comprising, in combination therewith, a brake-applying connection for each brake inclined rearwardly in a horizontal plane and terminating inside the outer edge of the frame to clear the wheel in its extreme position, an operating connection therefor outside the frame terminating opposite the rear end of the brake-applying connection, and a horizontal lever fulcrumed on the frame and connected to the front end of the operating connection and the rear end of the brake-applying connection.

4. A vehicle having a chassis frame and swivelled wheels on opposite sides of the frame having brakes, and comprising, in combination therewith, a brake-applying connection extending rearwardly from each brake, an operating connection terminating at its front end adjacent the rear end of the brake-applying connection, and a horizontal lever fulcrumed on the frame and pivoted at its end to one connection and between its ends to the other connection.

5. A vehicle having a chassis frame and swivelled wheels on opposite sides of the frame having brakes, and comprising, in combination therewith, a brake-applying connection extending rearwardly from each brake, an operating connection outside the frame terminating at its front end adjacent the rear end of the brake-applying connection, and a lever fulcrumed at its inner end on the frame and pivoted at its outer end to the operating connection and between its ends to the brake-applying connection.

6. A vehicle having a chassis frame and swivelled wheels on opposite sides of the frame having brakes, and comprising, in combination therewith, a brake-applying connection extending rearwardly from each brake, an operating connection outside the frame terminating at its front end adjacent the rear end of the brake-applying connection, a support extending inwardly of the frame adjacent said ends, and a horizontal lever fulcrumed at its inner end on said support inside of the frame and pivoted between its ends to the rear end of the brake-applying connection immediately under the frame and pivoted at its outer end to the front end of the operating connection outside of the frame.

In testimony whereof, I have hereunto signed my name.

WILLIAM JOSEPH ANDRES.